United States Patent [19]

Invernizzi et al.

[11] Patent Number: 4,738,074
[45] Date of Patent: Apr. 19, 1988

[54] APPARATUS FOR SHAPING AND PACKAGING LAYERED SPREADABLE FOOD PRODUCTS

[75] Inventors: Rutilio Invernizzi, Milan; Giancarlo Montesissa, Robbio, both of Italy

[73] Assignee: Nestec S. A., Vevey, Switzerland

[21] Appl. No.: 944,504

[22] Filed: Dec. 18, 1986

Related U.S. Application Data

[62] Division of Ser. No. 611,090, May 17, 1984, Pat. No. 4,666,723.

[30] Foreign Application Priority Data

Jun. 13, 1983 [EP] European Pat. Off. .......... 83105777

[51] Int. Cl.$^4$ ............................................. B65B 3/12
[52] U.S. Cl. ..................................... 53/122; 53/237; 53/266 R; 141/105; 425/131.1; 426/414
[58] Field of Search ............ 53/122, 237, 239, 266 R, 53/133, 576; 426/414, 412, 410, 516, 513, 249; 425/131.1, 132, 260, 570; 222/135, 129, 132; 141/105, 100, 9; 249/105, 107

[56] References Cited

U.S. PATENT DOCUMENTS

| | | |
|---|---|---|
| 1,463,851 | 8/1923 | Smith . |
| 1,486,748 | 3/1924 | Hilgers ..................... 53/519 |
| 2,145,240 | 1/1939 | Adams . |
| 2,214,325 | 9/1940 | Gothe ..................... 425/131.1 |
| 2,313,060 | 3/1943 | Friedman . |
| 2,334,052 | 11/1943 | Wedin . |
| 2,481,690 | 9/1949 | Schaub .................... 426/516 X |
| 2,683,932 | 7/1954 | Steenhuis . |
| 2,750,900 | 6/1956 | Moore . |
| 2,790,594 | 4/1957 | Hultkrans et al. ............. 229/87 |
| 2,803,381 | 8/1957 | Vouderis ..................... 222/135 |
| 3,080,238 | 3/1963 | Kraft et al. ..................... 99/178 |
| 3,113,530 | 12/1963 | Vestermark . |
| 3,174,652 | 3/1965 | Villemure ..................... 222/132 |
| 3,179,041 | 4/1965 | Luthi et al. ..................... 100/223 |
| 3,196,809 | 7/1965 | Nelson et al. . |
| 3,242,881 | 3/1966 | Schafer ..................... 425/131.1 |
| 3,266,214 | 8/1966 | Kramme ..................... 53/122 |
| 3,295,466 | 1/1967 | Bell et al. . |
| 3,295,467 | 1/1967 | Gropen . |
| 3,324,905 | 6/1967 | Paulo ..................... 141/100 |
| 3,342,143 | 9/1967 | Bell . |
| 3,359,925 | 12/1967 | Porada . |
| 3,366,309 | 1/1968 | Scharre ..................... 229/43 |
| 3,372,654 | 3/1968 | Bell . |
| 3,377,964 | 4/1968 | Bell et al. ..................... 425/131.1 |
| 3,392,685 | 7/1968 | Briggs . |
| 3,408,689 | 11/1968 | Heiner ..................... 53/122 X |
| 3,427,999 | 2/1969 | Schultz ..................... 425/132 |
| 3,468,026 | 9/1969 | Robertson et al. . |
| 3,511,669 | 7/1969 | Swartz et al. ..................... 426/414 X |
| 3,563,764 | 2/1971 | Posegate ..................... 426/414 X |
| 3,721,060 | 3/1973 | Quinto ..................... 53/576 X |
| 3,730,740 | 5/1973 | Schack et al. ..................... 99/187 |
| 3,734,274 | 5/1973 | Körner ..................... 206/46 F |
| 3,864,891 | 2/1975 | Piereder ..................... 53/122 X |
| 3,924,803 | 12/1975 | de Hapsburg ..................... 426/123 X |
| 3,991,217 | 11/1976 | Kinney ..................... 426/249 |
| 4,001,450 | 1/1977 | Ford et al. ..................... 426/410 |
| 4,015,644 | 4/1977 | Kinney ..................... 425/131 X |
| 4,019,547 | 4/1977 | Ross ..................... 141/11 |
| 4,052,836 | 10/1977 | Shaw ..................... 426/414 X |
| 4,058,953 | 11/1977 | Sanborn, Jr. et al. ..................... 53/86 X |
| 4,120,984 | 10/1978 | Richardson et al. ..................... 426/412 |
| 4,223,512 | 9/1980 | Buchner ..................... 53/425 |
| 4,363,822 | 12/1982 | Kleptz ..................... 426/513 |

FOREIGN PATENT DOCUMENTS

| | | |
|---|---|---|
| 0098324 | 3/1958 | Denmark . |
| 2310084 | 12/1976 | France . |
| 2475361 | 8/1981 | France . |
| 0538814 | 8/1973 | Switzerland . |
| 0854740 | 11/1960 | United Kingdom . |

*Primary Examiner*—James F. Coan
*Attorney, Agent, or Firm*—Vogt & O'Donnell

[57] ABSTRACT

To fill a container and produce and package portions of spreadable food products in multiple layers, such as differing types of processed cheeses, an apparatus is provided which has means for metering the spreadable food products, compartments for the separate and alternate shaping of layers of differing products and means for ejecting and guiding the layers into a container. Units are also provided for preparing the container upstream of the filling apparatus and for applying a tear strip to the container, and units are provided for applying lids and for sealing the filled container downstream of the filling apparatus.

10 Claims, 4 Drawing Sheets

FIG. 2a
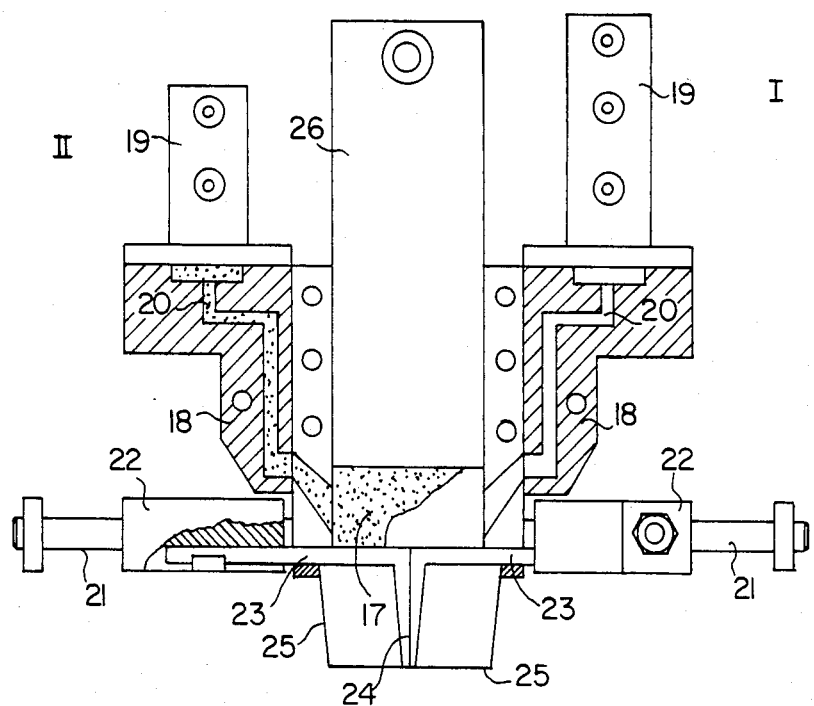
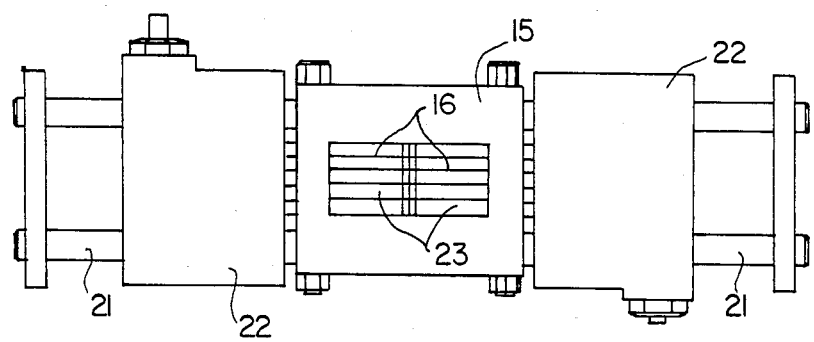
FIG. 2b g

APPARATUS FOR SHAPING AND PACKAGING LAYERED SPREADABLE FOOD PRODUCTS

CROSS-REFERENCE TO RELATED APPLICATION

This is a divisional application of application Ser. No. 611,090, filed May 17, 1984, now U.S. Pat. No. 4,666,723.

BACKGROUND OF THE INVENTION

The present invention relates to a process for metering, shaping and optionally packaging multi-layered portions of spreadable food products and to an apparatus for carrying out the process.

Portions of spreadable food products such as, for example, creamy processed cheeses are usually produced by pouring measured amounts of spread, under hot conditions, from a nozzle into shells of the desired shape with raised edges, fitting a cover, folding back and fixing the edges and removing the packed portions. It is difficult to meter the portions exactly and attempts to shape them prior to moulding have been abandoned owing to their viscous and sticky consistency. The problem is aggravated if they are arranged as distinct layers, by combining spreads which have quite different visual and organoleptic properties but which complement each other, to give the portions a contrasting stratified appearance, significantly improving the organoleptic sensations over those induced by the same products premixed in the portion.

According to the patent CH No. 538,814 and the published patent application FR No. 2,310,084, for example, portions of processed cheese are given a marbled appearance by injecting additives or a second spread with a different flavour or colour into a stream of first spread, upstream of the nozzle discharging the product into the shells. These processes do not produce the desired stratified portions.

Another method described in published patent application FR No. 2,475,361 proposes that the retentate from ultrafiltration of milk, before addition of rennet, be transformed into multi-layered cheeses by successively moulding each liquid layer on the previous, already coagulated layer or by mixing retentates of differing density which separate in the moulds by gravity and subsequently coagulate. This method can be applied only to cream cheeses and, moreover, produces only horizontal layers, the stratified appearance not being visible immediately after the packaging is opened.

Another process illustrated in U.S. Pat. No. 3,359,925 permits production of blocks of two-flavoured ice-cream arranged chequer-wise, whereas, according to U.S. Pat. No. 3,991,217, some pots are filled with several layers of different flavoured ice-creams arranged in vertical slices. According to these patents, at least two ice-creams of different flavour are transferred into a shaping chamber consisting of several compartments separated by thin walls, in which the layers are formed individually one beside the other and are extruded simultaneously into a packaging containter by means of pistons. These processes would not allow the desired multi-layered portions to be metered and shaped from spreadable products and, in particular, from processed cheeses as they would very quickly adhere to the pistons.

SUMMARY OF THE INVENTION

The present process solves the problem of producing multi-layered portions of a spreadable product such as, for example, processed cheese. It involves transferring individual measured amounts of spread, corresponding to the group of layers making up the portion, from at least two feed hoppers each containing a different spread, into at least two adjacent layer shaping compartments defined by partition walls, in a shaping chamber in which the layers of the differing spreads are formed individually, one beside the other, and are separated by thin partition walls, and then simultaneously ejecting all of the layers consitituting the portion from the shaping chamber through a nozzle extending this chamber into a pre-shaped shell.

The process is characterised by the fact that, whilst the layers are being ejected, they are guided individually to the bottom of the shell, with a minimum of deformation, and substantially all traces of spread are eliminated from the shaping chambers.

In this particular embodiment of a packaged portion, for example of processed cheese, the process also involves metering and shaping operations, applying a tear strip for easy opening, preparing a shell prior to metering and, after metering, fitting a lid, folding back and fixing the edges and removing the packed portions.

The invention also relates to an apparatus for carrying out the process, essentially comprising a unit for the separate metering of each group of layers of the same nature, for separate and alternate shaping of the layers, and for the ejection and guidance and depositing of each group of layers into the shell.

The apparatus is characterised by the fact that the metering and shaping unit comprises means for shaping the layers separately, means for ejecting the layers simultaneously, means for guiding and depositing the adjacent layers individually within a group into the bottom of the shell throughout the ejection operation and means for eliminating substantially all residual traces of spread from the shaped layers.

According to a particular embodiment in which portions, for example of processed cheese, are to be packaged, the apparatus also comprises units for the application of a tear strip for opening, and for stamping a shell upstream of the metering unit and units for fitting a lid, folding back the edges, fixing the edges and removing the packaged portion down-stream thereof.

The attached drawings show, by way of example, an embodiment of the invention.

BRIEF DESCRIPTION OF THE DRAWINGS

FIG. 2a is a side view with a more detailed partial longitudinal section of the shaping unit.

FIG. 2b is a view of the shaping assembly from below.

DETAILED DESCRIPTION OF THE DRAWINGS

Figure 1:
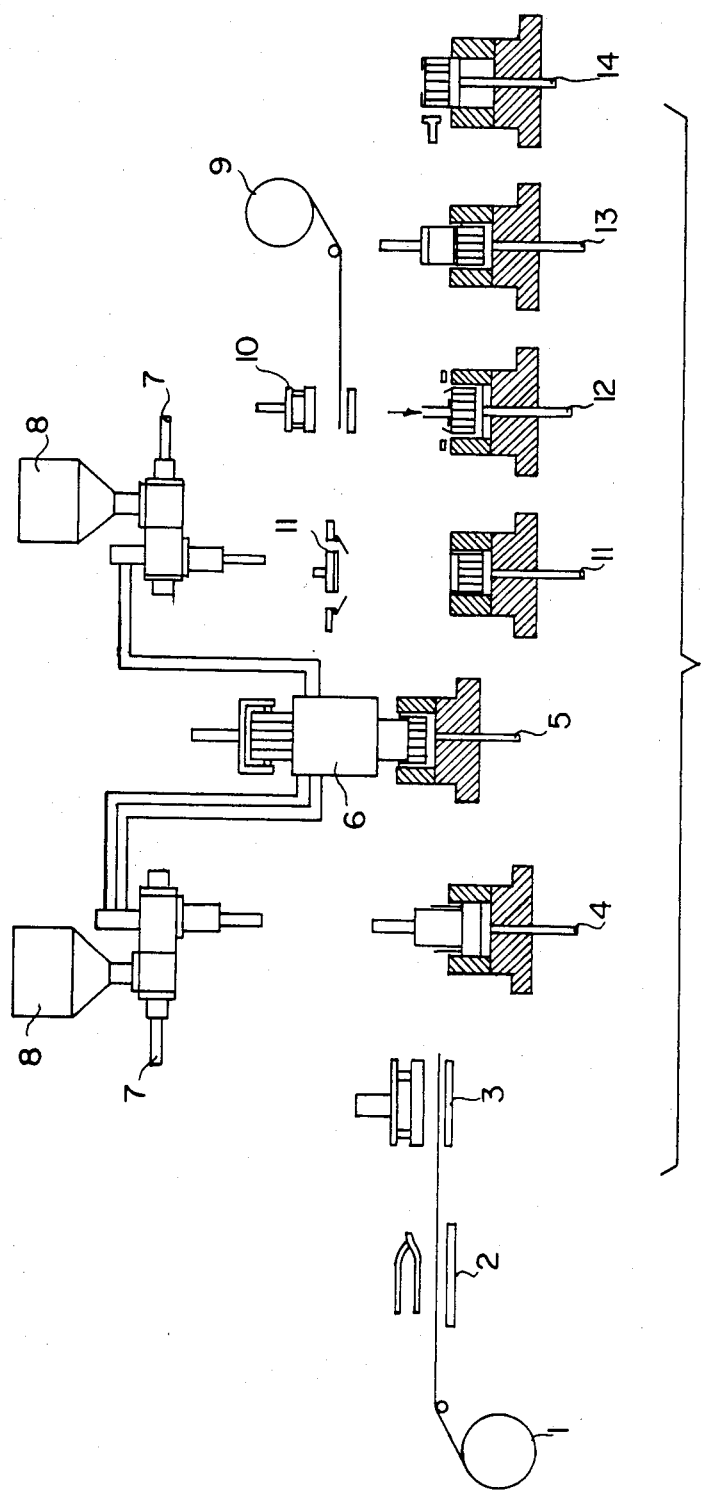
FIG. 1 shows a schematic view of an entire apparatus for the production of multi-layered portions.

In FIG. 1, a film which forms the shell and which can be composed, for example, of composite plastics material or preferably aluminium, is unwound from a spool 1 to a unit for the application of tear strips for easy opening 2. The blank is cut to the desired shape at unit 3. At 4, the shell is shaped by stamping (or heat shaping in the case of a plastics film, in which case this operation preferably takes place prior to cutting) and is placed at the bottom of a cavity brought by a conveyor belt or preferably a rotating table (not shown) which advances rhythmically and which has the function of transferring the cavity from one unit to another. At unit 5, the shell held in the cavity is lifted to a shaping and ejection unit 6 from which it receives the layers which have in the meantime been shaped. The spreads forming the layers originate from two groups of multiple feed fillers 7 connected to two feed hoppers 8. The film, for example of aluminium, for the preparation of the lid is unwound from a spool 9 and travels towards a cutting unit 10. In the following phase 11, the lid is placed on the portion and the shell is closed while still in its cavity. At the following units, the edges of the shell are folded back over the lid 12 and are fixed, for example, by heat-welding using a heated press 13. The packaged portion is ejected from the cavity at unit 14 and is delivered from the conveyor belt or table.

In FIGS. 2a and 2b, the central body of the shaping chamber 15 is constituted by a number of partitions (not shown) and of thin steel alloy plates 16 which are held between two head members and define five layer shaping compartments 17 (one compartment and the adjacent compartment have been shown with only a portion of the dividing wall between the two compartments for the sake of clarity).

Two supports 18 fix the shaping assembly to the structure of the machine and direct the product arriving from the headers 19 via feed pipes 20 to the shaping compartments 17 through the shaping chamber housing wall at the base of the shaping compartments. According to one embodiment, the right-hand header connects three pipes for the intake of product I originating from one of the multiple feed fillers 7 (shown on the left of FIG. 1); the left-hand header connects the two pipes for the intake of product II originating from the other multiple feed filler 7 (shown on the right of FIG. 1). The layers are metered by two groups of multiple feed fillers with controlled valves (not shown). The layers are metered individually into separate compartments: the layers of product I via a group having three elements and the layers of product II via a group having two elements. The weight of the layers can be determined in advance and can be regulated continuously for each group of fillers in known manner by adjusting the stroke of the filler pistons.

At the bottom end of the central body, or base of the shaping chamber, there are two shafts 21 on which two carriages 22 slide supporting hammer-shaped elements 23, capable of reciprocation, which constitute the bottom of the shaping chamber with their tapered ends 24 pointing downwards. These reciprocating elements 23 open and close the shaping chamber at its bottom end, or base, by sliding laterally between the dividing walls 16.

The elements 23 are enclosed in a protective housing 25 having the shape of a parallelepiped and with a slight relief on two of its walls. As illustrated, housing 25 is co-extensive with and an extension of the shaping chamber housing wall. This housing extends the shaping chamber and its compartments and constitutes a nozzle for pouring the spreads which is adapted to enter the shell. Five slidable ejection devices 26 made, for example, from wear-resistant plastics material, are adjusted so as to slide co-extensively with the interior and beyond the base of the compartments of the shaping chamber and push the layers out of the shaping chamber, depositing them at the bottom of the shell.

Figure 3:
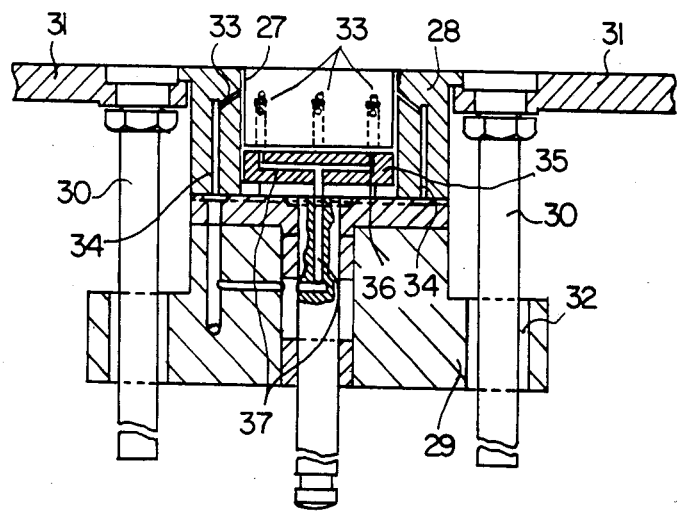
FIG. 3 illustrates an embodiment of the device for conveying the shells from one unit to another in the apparatus, showing a detailed section of a cavity type conveyor.

In FIG. 3, a shell 27 is placed in a cavity 28 which has the functions of receiving the shell coming from the stamping unit, conveying it beneath the shaping unit, lifting it up to the pouring nozzle, lowering it as the layers are ejected from the shaping compartments and removing the packaged portion. The cavity 28, made, for example, of special aluminium, is supported by a carriage 29 sliding on two vertical shafts 30 integral with a rotating table 31 by means of axial bearings 32. Openings 33 are distributed over the side walls of the cavity 28. These openings are connected by pipes 34 to a vacuum system and their function is to hold the sides of the shell against the walls of the cavity, in particular to make it easier to introduce the pouring nozzle of the shaping device into the shell. The bottom of the cavity is constituted by a moving piston 35 which enables the shell to be located vertically beneath the folding unit (FIG. 1, numeral 12) and enables the packaged portion to be ejected once the edges have been fixed (FIG. 1, numerals 13 and 14). Some openings 36 are provided in the piston 35 and connected by pipes 37 to the above-mentioned vacuum system. Their function is to prevent the shell from being dragged upwards after being filled, due to the suction caused by the return of the ejectors, as described in more detail below.

Figure 4:
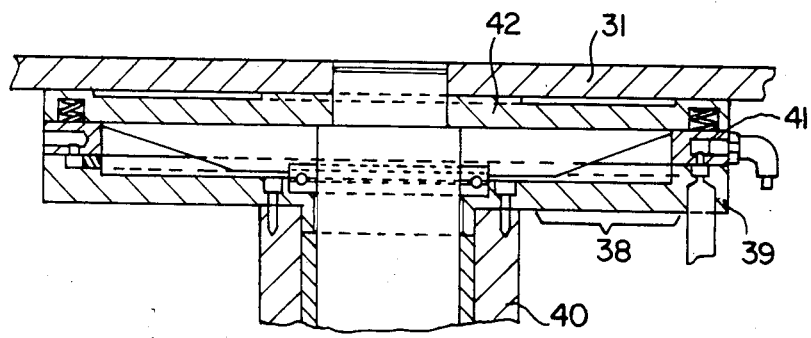
FIG. 4 is a partial section through an embodiment of the device for conveying the shells.

The vacuum pipes 34,37 are connected to a vacuum distribution cam 38 mounted on the rotating table 31 shown in FIG. 4 which has the function of opening and closing the connections with the vacuum during the operating cycle. The cam 38 consists of two portions of which one 39, the stationary portion, is connected to the central support 40 of the rotating table and of which the other 41, the moving portion, is integral with the support 42 of the rotating table 31.

Figure 5:
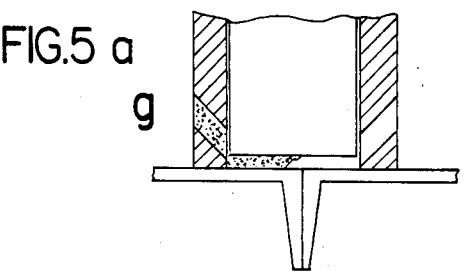
Figure 5:
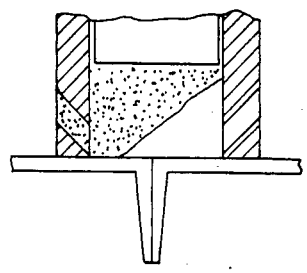
Figure 5:
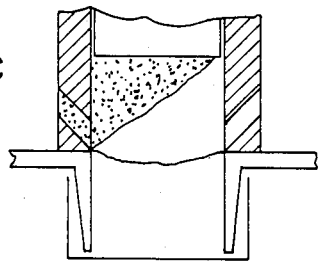
Figure 5:
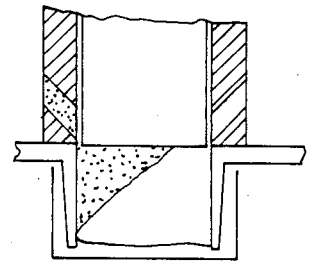
Figure 5:
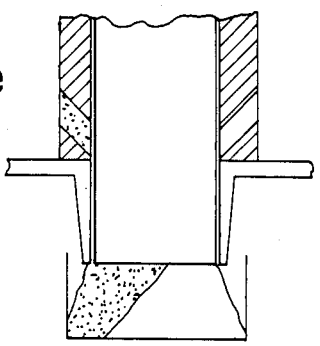
Figure 5:
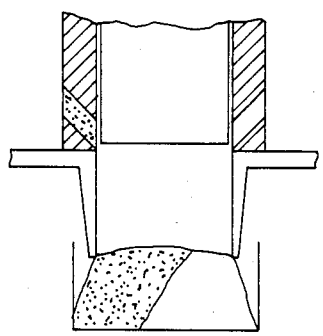

The diagrams in FIG. 5 illustrate the metering shaping, ejection and depositing measured amounts of each differing spreadable food product in two adjacent layers of the portion, omitting a portion of the dividing wall between the two layers for the sake of clarity.

At A, the slidable reciprocating hammer-shaped elements are closed, the slidable ejectors are shown in an intermediate position and amounts of the spreads are metered and introduced through the shaping chamber housing wall at the base of each shaping compartment.

At B, the ejectors rise to leave room for the products filling the shaping compartments and thus the portions are formed and shaped into adjacent layers in a quantity corresponding to the volume of the container.

At C, the shell is conveyed to beneath and within proximity of the shaping chamber and is raised up such that the bottom of the container shell is proximate to the bottom of the base housing and the distended portions of the hammer-shaped elements constituting the end of the pouring nozzle and, simultaneously, the elements slide and open the bottom of the compartments.

At D, the layers simultaneously are ejected and are pushed to the bottom of the shell in discrete layers by the ejectors.

At E, the shell descends at the same time as the ejectors which are completing their travel downwards until the bases of the ejectors reach the lower edge of the distended tapered portions of the slidable hammer-shaped elements and base housing to complete filling the container shell.

At F, the ejectors rise above the hammer-shaped slidable elements whilst restraining the filled container from movement, and at G the elements close, ejecting substantially all the remains of spread from the shaping chamber. The tapered end of the elements helps to detach the product while the shell falls to the level of the table which rotates so as to bring the cavity to the following unit, and the cycle recommences from position A.

It can be seen that, in phases D, E and F, the product is guided by the elements to the bottom of the shell whereas, at E, all the layers are deposited smoothly in the shell. It is obvious that the progressiveness of the relative movement between the shell and the ejectors is of paramount importance for avoiding deformation of the layers. As a variation, therefore, the shell could be kept stationary in the position which it occupies at D and the shaping chamber could be raised while the ejectors descend. This is of less advantage, however, due to the greater mechanical stresses.

It has also been found that it is important for the edges of the shell to be held flat against those of the cavity by the vacuum during phases C to F whereas, in phase F, the bottom of the shell must be held on the piston also by the effect of the vacuum to prevent the portion from being sucked upwards when the ejectors rise.

Figure 6:
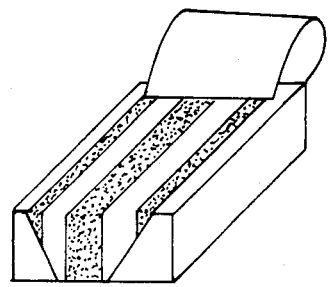
FIGS. 5a–5f illustrate schematically sequences of shaping and conveying the portion in the shell and FIG. 6 shows a perspective view of a portion with the packaging open, revealing the striped structure of the portion.

FIG. 6 shows a packaged portion exhibiting the different layers. The portion has the shape of a rectangular parallelepiped. It is obvious that it could assume, for example, the shape of a parallelepiped of square base, a cube, a right prism of polygonal base, etc. Similarly, layers having the same shape as the portion have been shown but they could easily be of different shape and number and could also differ from each other by adapting the geometry of the shaping compartments, of the ejectors, of the pouring nozzle and of the shell and by regulating the quantity of product to be metered, into the compartments.

The constituents of two adjacent layers of the portion will preferably be well contrasted from the point of view of colour, taste and consistency, providing that the spreads are compatible with each other, in order to prevent their constituents from migrating during storage due, for example, to a difference in osmotic pressure. Similarly, close rheological behaviour will prevent difficulties of metering and filling.

The cheese spreads may contain additives such as colorants, small particles, for example, of spices or flavourings or also shaped elements such as pieces of fruit, for example walnuts, hazelnuts, grapes, etc. The combination of a cheese spread having a full-bodied taste with a mild spread such as, for example, acidic curd rich in fats—acidic curd rich in fats, flavoured with herbs and pepper; ripe cheddar, butter and pepper—fontal and pepper; ripe provolone and cheddar—fontal and butter; ripe emmenthal and butter—acidic curd rich in fats and cream, acidic curd rich in fats, mascarpone-roquefort, gorgonzola, etc.

Although the apparatus is particularly adapted for the metering and shaping of cheese spreads, it can obviously be used for producing portions of other spreadable and sticky food products such as fruit jellies, chocolate spreads, confectionary compositions, cereal pasta, purees etc., optionally combined with compatible cheese spreads.

The various mechanisms of the installation are controlled in a known but not illustrated manner by a main shaft driven by a hydraulic motor or by an electric reduction motor. The main shaft drives a countershaft bearing guided cams and eccentric discs to which levers are connected, these levers actuating in synchronization the moving parts of the various units such as filling pistons, elements, ejectors, cavities, pistons, etc. The various elements could also be controlled by pneumatic means. In the embodiment consisting of a rotating table, the rotating table can be actuated in step-wise fashion by a known, so-called "Maltese cross" mechanism.

We claim:

1. Apparatus for filling a container with adjacent layers of differing spreadable food products comprising:
    a shaping chamber having at least two separate adjacent compartments defined by partition walls for shaping and maintaining each differing spreadable food product in separate adjacent layers and being associated with means for metering a spreadable food product to each separate compartment at the base thereof;
    means within each compartment for ejecting each separate layer simultaneously from the shaping chamber;
    means for guiding the layers from the compartments to the bottom of a container including hammer-shaped elements with downwardly pointing tapered ends for detaching the food product in the filled container from the apparatus; and
    means for providing relative movement of the container with the ejecting means while the container is being filled.

2. An apparatus according to claim 1 further comprising a unit for forming the container upstream from the filling apparatus.

3. An apparatus according to claim 2 wherein the unit further comprises means for applying a tear strip to a formed container.

4. An apparatus according to claim 1 or 2 or 3 further comprising a unit for closing the filled container downstream from the filling apparatus.

5. An apparatus according to claim 1 wherein the hammer-shaped elements are opposingly reciprocably slidable and wherein the upper portion of the elements form the base of the shaping chamber and the bottom of the compartments.

6. An apparatus according to claim 1 wherein the means for guiding the layers further includes a housing which is co-extensive with and an extension of the shaping chamber housing and which is about the hammer-shaped elements.

7. An apparatus according to claim 1 wherein the ejecting means is an ejector within each compartment which is slidable co-extensive with the interior of each compartment and to the full extent of the tapered ends of the hammer-shaped elements.

8. An apparatus according to claim 1 wherein the means for providing relative movement is capable of moving the container away from the shaping chamber and the hammer-shaped elements as the ejecting means eject product towards and into the container.

9. An apparatus as claimed in claim 1 wherein the means for relative movement between the container and the ejecting means is capable of moving the shaping chamber and hammer-shaped elements away from the container as the ejecting means eject product towards and into the container.

10. An apparatus for metering, shaping and depositing differing spreadable food products in distinct layers into a container shell comprising:

a shaping chamber having at least two separate adjacent layer shaping compartments which are defined by partition walls, each of the compartments being capable of receiving a spreadable food product at the base thereof and through a housing wall of the shaping chamber;

means for metering a spreadable food product to each compartment;

a shaping chamber base defined by two hammer-shaped elements each capable of being opposingly slidable and each having a lower distended tapered portion;

slidable ejector means within each compartment capable of sliding co-extensive with the interior and beyond the base of each compartment to the extent of the lower distended tapered portion of the hammer-shaped elements;

a housing wall co-extensive with and an extension of the shaping chamber housing wall encompassing the shaping chamber base and hammer-shaped elements; and means for providing relative movement of the container with the ejecting means while the container is being filled.

* * * * *

UNITED STATES PATENT AND TRADEMARK OFFICE
CERTIFICATE OF CORRECTION

PATENT NO. : 4,738,074

DATED : April 19, 1988

INVENTOR(S) : Rutilio Invernizzi, et al.

It is certified that error appears in the above-identified patent and that said Letters Patent is hereby corrected as shown below:

On the title page, under the heading "U.S. PATENT DOCUMENTS", the issue date set forth for the Swartz, et al. reference, U.S. Patent No. 3,511,669, should be --7/1966--.

Column 2, line 10, after "compartments" insert a comma.

Column 3, line 65, "reciprocation" should be --reciprocating--.

Column 5, line 3, after "layers" insert --are--; then, after "simultaneously" delete "are".

Signed and Sealed this

Twenty-seventh Day of December, 1988

Attest:

DONALD J. QUIGG

*Attesting Officer*   Commissioner of Patents and Trademarks